United States Patent Office 3,022,300
Patented Feb. 20, 1962

3,022,300
METHOD OF PREPARING SULFENAMIDES
Albert F. Hardman, Northampton Township, Summit County, Ohio, assignor to The Goodyear Tire & Rubber Company, Akron, Ohio, a corporation of Ohio
No Drawing. Filed Sept. 23, 1954, Ser. No. 458,030
10 Claims. (Cl. 260—247.1)

This invention relates to a method of preparing sulfenamides.

Sulfenamides have become of commercial importance as lubricating oil additives, fungicides and as rubber accelerators. These materials are used in lubricating oils as antioxidants; in cords and fabrics and as a coating on seeds to inhibit or retard the growth of fungi; and in rubber as delayed-action, non-scorching accelerators of vulcanization.

It is an object of this invention to provide an improved method of preparing sulfenamides which may be used in the above applications. It is another object to provide a method for the preparation of sulfenamides which gives consistently good yields of these materials in a high state of purity. Other objects will appear hereinafter as the description of the invention proceeds.

Various methods have been proposed for the preparation of sulfenamides. Some of these methods involve the oxidative condensation of a mercaptan or a disulfide with an amine in aqueous alkaline medium; the oxidative condensation of a mercaptan or a disulfide with an amine in aqueous medium in the presence of an alkali metal sulfate such as sodium sulfate; or the reaction of a metal, ammonium, or amine salt of a mercaptan with an N-chloro secondary amine in water or an organic solvent. These methods produce satisfactory yields of most sulfenamides, but they have not been entirely satisfactory from a commercial standpoint because they require the use of an excess of the amine to give good yields, and amines are relatively expensive chemicals. Consequently, to economically use the methods of the prior art some method had to be used to recover the excess amine which would otherwise be discarded in the waste solutions from the reactions.

According to the present invention, sulfenamides are prepared by reacting together an organic disulfide, a secondary amine, an N-chloro secondary amine and ammonia.

The reactants are most efficiently utilized and the best yields of product are obtained by reacting one mol of the disulfide with about one mol of the N-chloro secondary amine, about one mol of the secondary amine and at least one mol of ammonia.

It is generally desirable to use an excess of the ammonia. The products obtained from the reactions involved in this method are the sulfenamide and ammonium chloride. Since ammonium chloride is a relatively cheap chemical it can be discarded. The recovery of excess amine required for economical operation of the prior art methods is eliminated.

The secondary amines used in the practice of the invention can be represented by the structural formula

in which R and R' can be the same or different radicals. They can be aliphatic, including saturated and unsaturated, straight chain and branched chain aliphatic. They can also be alicyclic or cycloaliphatic. They can also be substituted aliphatic radicals, such as the aralkyl radicals, furfuryl, tetrahydrofurfuryl, etc. Also, R and R' may together form a single ring, as in the piperidyl, morpholyl, piperazyl and similar radicals. Representative examples of such secondary amines are the dialkyl amines such as dimethylamine, diethylamine, di-n-propylamine, diisopropylamine, di-n-butylamine, diisobutylamine, diamylamine, dioctylamine, methylethylamine, methylpropylamine, and methylbutylamine, unsaturated aliphatic amines such as diallylamine, dicrotylamine and dimethallylamine, diaralkylamines such as dibenzylamine, and other ring substituted aliphatic amines such as difurfurylamine and ditetrahydrofurfurylamine, secondary cycloaliphatic amines such as dicyclohexylamine, morpholine, piperidine, thiomorpholine and piperazine and secondary amines having mixed substituents such as methylcyclohexylamine, methylbenzylamine, ethylbenzylamine, and ethylcyclohexylamine.

The N-chloramines which can be used are those corresponding to the foregoing types of amines and may be the same as or different from the amine used in the reaction.

Various azyldisulfides can also be used, including thiazyldisulfides, oxazyldisulfides and imidazyldisulfides. The thiazyldisulfides, and particularly the benzothiazyldisulfides, are preferred materials. Representative examples of such azyldisulfides are 4,4',5,5' tetramethylthiazyldisulfide, 4,4',5,5' tetramethyloxazyldisulfide, 4,4',5,5' tetramethylimidazyldisulfide, 4,4' - dimethylthiazyldisulfide, 4,4'-dimethyloxazyldisulfide, 4,4'-dimethylimidazyldisulfide, 4,4'-diphenylthiazyldisulfide, 4,4'-diphenyloxazyldisulfide, 4,4'-diphenylimidazyldisulfide, 4,4'-diethylthiazyldisulfide, 4,4'-diethyloxazyldisulfide, 4,4'-diethylimidazyldisulfide, bis(benzothiazyl) disulfide, bis(tetrahydrobenzothiazyl) disulfide, bis(benzoxazyl) disulfide, bis(benzimidazyl) disulfide, bis(naphthothiazyl) disulfide, bis (napthooxazyl) disulfide and bis(napthoimidazyl) disulfide.

The following example illustrates the invention and shows how it may be accomplished:

*Example*

Eighty-three and five-tenths grams of 2,2'-bis(benzothiazyl) disulfide, 155 milliliters of methanol containing 4.25 grams of $NH_3$ gas, and 22 grams of morpholine were placed in a 1-liter 3-neck flask equipped with a stirrer and reflux condenser. The slurry was stirred and 30.5 grams of N-chloromorpholine were slowly added. The temperature increased to about 60° C. and after all of the N-chloromorpholine had been added the mixture was heated on a steam bath at refluxing temperature for about 5 minutes. The solution was decanted from the flask, cooled, seeded and stirred until the product crystallized. Two hundred to 300 milliliters of cold water were added and the product was filtered, washed with warm water and dried. A yield of 97% of theory was obtained. The product had a melting range of 85 to 86° C.

The reaction is carried out in an inert, organic solvent. Alcohols and other organic solvents can be used, such as ethanol, isopropanol, normal propanol, isobutanol, secondary butanol, normal butanol, benzene, toluene, xylene, ether, dioxane, and petroleum ether. The presence of water causes a lowering of the yields of product obtainable. For best results, the solvent used should contain not more than 10% by weight of water and preferably not more than 5%. Best yields are obtained when the system is substantially anhydrous, i.e., when the reaction mixture contains less than 1% by weight of water.

The example shows the preparation of the sulfenamide at refluxing temperature of the mixture. Lower reaction temperatures can be used, but the reaction time must then be increased accordingly. The temperature is not critical. It is, of course, desirable to use a temperature high enough to get a practical rate of reaction and low enough to avoid decomposition.

Instead of purifying the product by crystallization as shown above, other methods can be used, if desired.

While certain representative embodiments and details have been shown for the purpose of illustrating the invention, it will be apparent to those skilled in this art that various changes and modifications may be made therein without departing from the spirit or scope of the invention.

I claim:

1. The method of preparing sulfenamides which comprises reacting one mol of an organic disulfide selected from the group consisting of thiazyldisulfides, oxazyldisulfides and imidazyldisulfides with (a) at least one mol of ammonia, (b) about one mol of a secondary amine having the structural formula:

in which R and R' are radicals selected from the group consisting of aliphatic hydrocarbon, cycloaliphatic hydrocarbon, aralkyl and radicals in which R and R' form a part of a single ring selected from the group consisting of furfuryl, tetrahydrofurfuryl, morpholyl, piperazyl and piperidyl and (c) one mol of an N-chloramine of an amine selected from the same class in a solvent containing not more than 10 percent by weight of water.

2. The method of preparing thiazolesulfenamides which comprises reacting one mol of a thiazyldisulfide with (a) at least one mol of ammonia, (b) about one mol of a secondary amine having the structural formula:

in which R and R' are radicals selected from the group consisting of aliphatic hydrocarbon, cycloaliphatic hydrocarbon, aralkyl and radicals in which R and R' form a part of a single ring selected from the group consisting of furfuryl, tetrahydrofurfuryl, morpholyl, piperazyl and piperidyl and (c) one mol of an N-chloramine of an amine selected from the same class in a solvent containing not more than 10 percent by weight of water.

3. The method of preparing benzothiazolesulfenamides which comprises reacting one mol of a bis(benzothiazyl) disulfide with (a) at least one mol of ammonia, (b) about one mol of a secondary amine having the structural formula:

in which R and R' are radicals selected from the group consisting of aliphatic hydrocarbon, cycloaliphatic hydrocarbon, aralkyl and radicals in which R and R' form a part of a single ring selected from the group consisting of furfuryl, tetrahydrofurfuryl, morpholyl, piperazyl and piperidyl and (c) one mol of an N-chloramine of an amine selected from the same class in a solvent containing not more than 10 percent by weight of water.

4. The process of preparing di-n-propyl benzothiazole sulfenamide which comprises reacting in a solvent one mol of 2,2'-bis(benzothiazyl) disulfide with about one mol of di-n-propylamine, one mol of N-chloro-di-n-propylamine and at least one mol of ammonia, said solvent containing not more than 10 percent by weight of water.

5. The process of preparing di-n-butyl benzothiazole sulfenamide which comprises reacting in a solvent one mol of 2,2'-bis(benzothiazyl) disulfide with about one mol of di-n-butylamine, one mol of N-chloro-di-n-butylamine and at least one mol of ammonia, said solvent containing no more than 10 percent by weight of water.

6. The process of preparing dicyclohexyl benzothiazole sulfenamide which comprises reacting in a solvent one mol of 2,2'-bis(benzothiazyl) disulfide with about one mol of dicyclohexylamine, one mol of N-chlorodicyclo hexylamine and at least one mol of ammonia, said solvent containing not more than 10 percent by weight of water.

7. The process of preparing methylbenzyl benzothiazole sulfenamide which comprises reacting in a solvent one mol of 2,2'-bis(benzothiazyl) disulfide with about one mol of methylbenzylamine, one mol of N-chloromethylbenzylamine, and at least one mol of ammonia, said solvent containing not more than 10 percent by weight of water.

8. The process of preparing N-oxydiethylene-2-benzothiazole-sulfenamide which comprises reacting in methanol solution 2,2'-bis(benzothiazyl) disulfide, morpholine, N-chloromorpholine, and ammonia in the ratio of 1 mol of 2,2'-bis(benzothiazyl) disulfide to 1 mol of morpholine to 1 mol of N-chloromorpholine to at least 1 mol of ammonia said methanol containing not more than 10% by weight of water.

9. The process of preparing N-oxydiethylene-2-benzothiazole-sulfenamide which comprises reacting in methanol solution 2,2'-bis(benzothiazyl) disulfide, morpholine, N-chloromorpholine, and ammonia in the ratio of 1 mol of 2,2'-bis(benzothiazyl) disulfide to 1 mol of morpholine to 1 mol of N-chloromorpholine to at least 1 mol of ammonia, said methanol solution containing not more than 5% by weight of water.

10. The process of preparing N-oxydiethylene-2-benzothiazole-sulfenamide which comprises reacting in methanol solution 2,2'-bis(benzothiazyl) disulfide, morpholine, N-chloromorpholine, and ammonia in the ratio of 1 mol of 2,2'-bis(benzothiazyl) disulfide to 1 mol of morpholine to 1 mol of N-chloromorpholine to at least 1 mol of ammonia, said methanol solution being substantially anhydrous.

References Cited in the file of this patent

UNITED STATES PATENTS

| 2,045,888 | Tschunkur | June 30, 1936 |
| 2,495,085 | Alliger | Jan. 17, 1950 |
| 2,560,035 | Alliger | July 10, 1951 |
| 2,560,046 | Alliger | July 10, 1951 |
| 2,730,527 | Kinstler | Jan. 10, 1956 |
| 2,772,278 | Hardman | Nov. 27, 1956 |

FOREIGN PATENTS

| 1,055,726 | France | Oct. 14, 1953 |